United States Patent [19]

Starling et al.

[11] 4,006,808
[45] Feb. 8, 1977

[54] CONTROLS FOR A CENTRIFUGAL FLUID CLUTCH

[75] Inventors: James G. Starling; Jay J. Wait; Craig W. Riediger, all of Peoria, Ill.

[73] Assignee: Caterpillar Tractor Co., Peoria, Ill.

[22] Filed: May 27, 1975

[21] Appl. No.: 581,007

[52] U.S. Cl. .................. 192/103 FA; 192/105 A; 192/87.12; 137/49

[51] Int. Cl.² .................. F16D 43/284

[58] Field of Search ..... 192/103 FA, 105 A, 105 F, 192/104 F, 106 F, 85 F, 87.12

[56] References Cited

UNITED STATES PATENTS

| 3,094,203 | 6/1963 | Zania et al. | 192/106 F |
| 3,534,840 | 10/1970 | Snoy | 192/103 FA |
| 3,537,557 | 11/1970 | Olson | 192/104 F |
| 3,556,271 | 1/1971 | Hilpert | 192/104 F |
| 3,872,956 | 3/1975 | Herr et al. | 192/103 FA |
| 3,913,715 | 10/1975 | Groves | 192/103 FA |

Primary Examiner—Benjamin W. Wyche
Attorney, Agent, or Firm—Charles E. Lanchantin, Jr.

[57] ABSTRACT

A control system, for a rotating clutch having a rotating housing with a cavity adapted to axially slidably receive a clutch actuating piston therein and defining a clutch actuating chamber therebetween, includes a source of fluid, a control valve for infinitely variably supplying the fluid through a path in the housing to the actuating chamber so that the actuating piston is biased in a direction to engage the clutch, a plurality of passages in the housing disposed in fluid communication with the actuating chamber and the path, and including a fluid exhaust passage connecting therewith, and a differentially sensitive centrifugal valve slidably disposed in the passages for relieving fluid from the actuating chamber to the exhaust passage in response to centrifugal force and to fluid pressure in the actuating chamber, and in opposition to fluid pressure in the path in a differential area ratio responsive manner.

8 Claims, 7 Drawing Figures

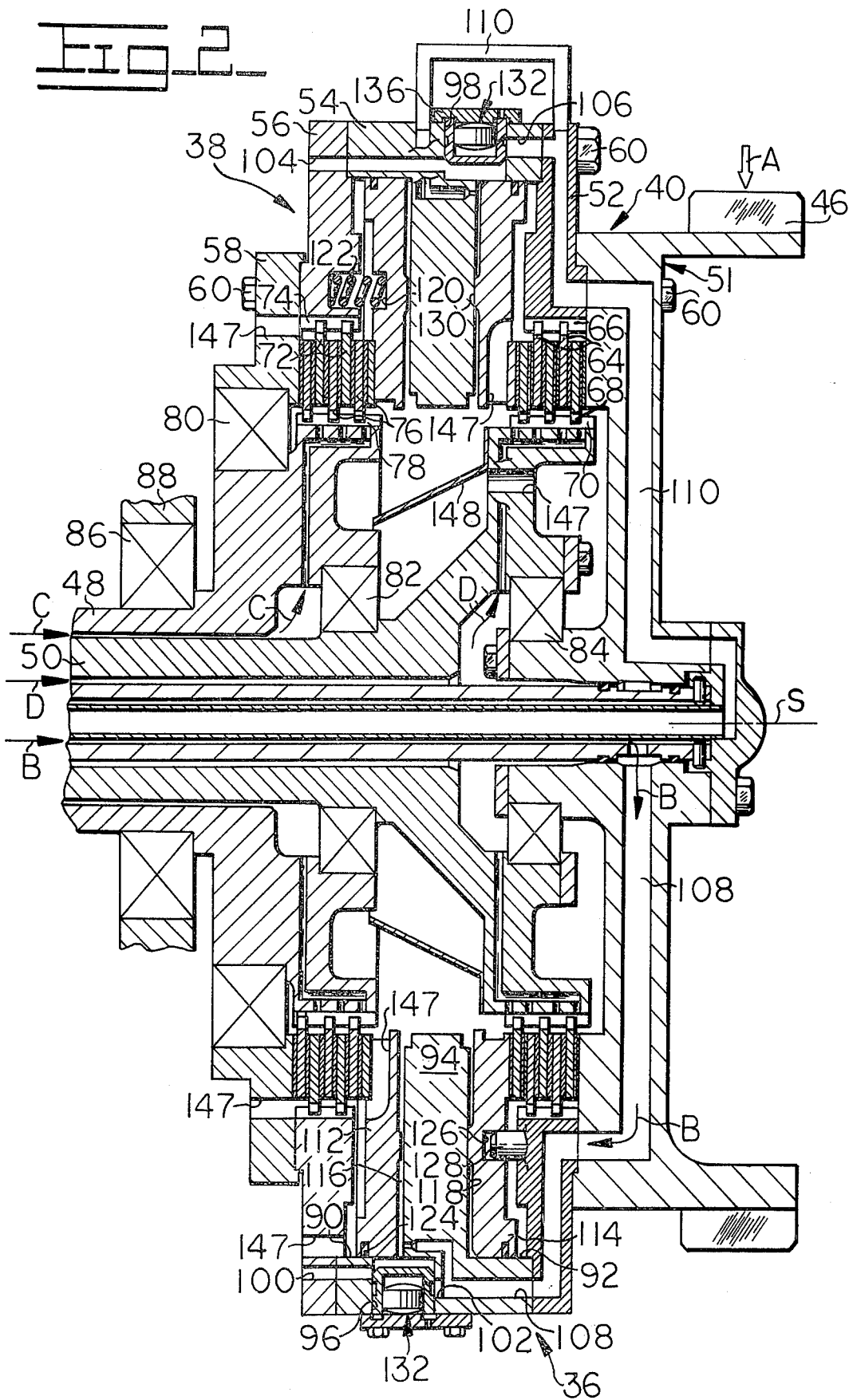

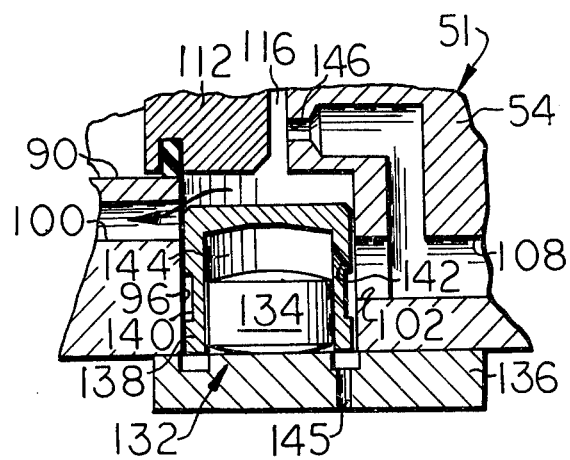
Fig_3
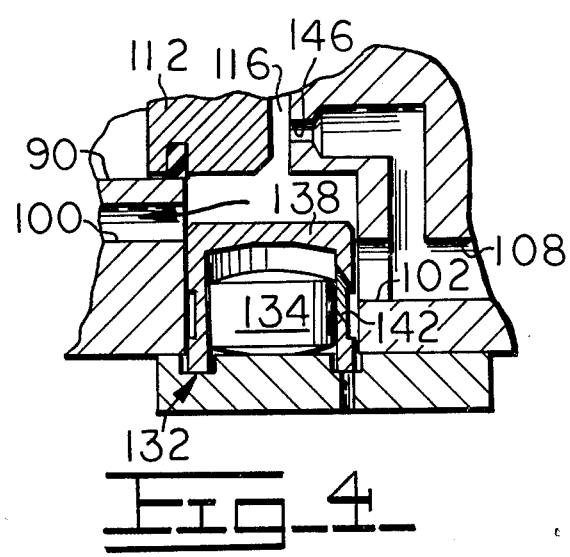
Fig_4
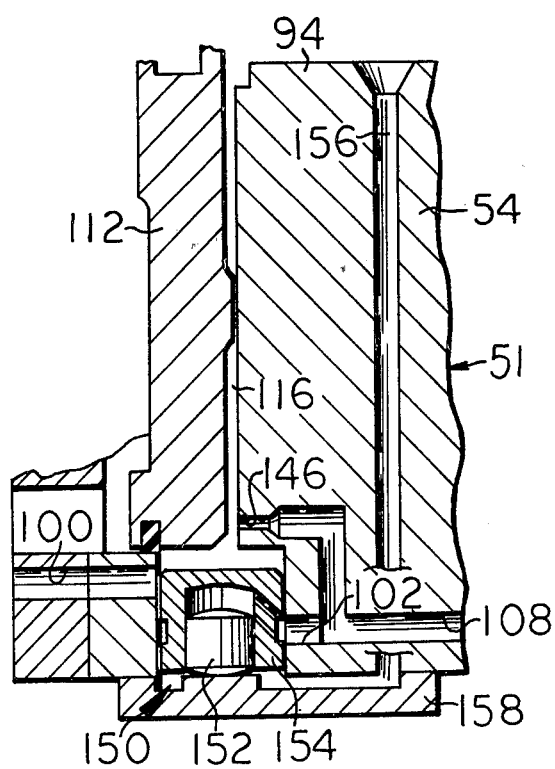
Fig_7

CONTROLS FOR A CENTRIFUGAL FLUID CLUTCH

BACKGROUND OF THE INVENTION

Hydraulically actuated rotating clutches and their associated control systems are being developed for both vehicle and marine engine driven power trains in order to better allow apportioned power delivery to the power train output shaft and to the engine driven auxiliary equipment, in accordance with the working conditions being experienced. Such selective division of power is preferably achieved through use of a closely controlled and continuously slippable disc-type clutch. This kind of clutch permits the delivery of a relatively low amount of power to the output shaft while at the same time allowing the engine to operate at a relatively high rate of speed. Subsequently, the vehicle or marine gear can be operated at a creeping rate of speed while also enabling auxiliary equipment, such as hydraulic pumps and the like, to be driven at an effectively high rate of speed.

The aforementioned diverse requirements have led to a wider introduction of disc-type slippable clutches and various centrifugally operated valves to better control them. For example, the rotating clutch and control system of U.S. Pat. No. 3,872,956 issued Mar. 25, 1975 to C. H. Herr et al, and assigned to the assignee of the present invention, incorporates a pair of rotating clutches which have been found particularly useful in a marine transmission for an ocean-going vessel. Each of the clutches incorporates a radially inwardly open actuating chamber with a rotating torus of fluid of selected depth therein for engaging the clutch actuating piston. Also operationally incorporated with each piston is a centrifugally operated valve which is exposed to the pressure of the fluid torus and is further responsive to a single source of fluid from the clutch control valve. While the system of the referenced patent is a considerable advancement in the art, it has been noted that when operating at a relatively low rate of rotational speed, the centrifugally responsive valve is less sensitive than desired to the relatively low pressure of the fluid torus. This has necessitated supplying fluid from the clutch control valve at a relatively low pressure and in a relatively narrow range of pressure of, for example, approximately zero to 35 psi. Consequently, the clutch control valve must be of more complex and sophisticated construction in order to obtain the desired response. Further, the centrifugally responsive valve of the referenced patent is subject to fluid flow forces through the valve that add to the difficulty of controlling it.

Further exemplifying the prior art efforts to produce continuously slippable friction clutches and centrifugally operated valves therefor, is U.S. Pat. No. 3,352,395 issued Nov. 14, 1967 to C. R. Hilpert. However, the centrifugally operated valves disclosed therein are relatively complex and costly in construction, such as requiring springs or compensating pins or the like, and are not sensitive to the pressure in the substantially closed clutch piston actuating chamber. Because these closed chambers are generally operated at relatively high pressures there is less need for their centrifugally operated valves to have a high degree of sensitivity.

It should also be noted that while a considerable number of prior art patents utilize a centrifugally responsive valve intermediate the control valve and a closed actuating chamber, they primarily serve to only quickly dump fluid from the chamber upon terminating operating pressure thereto. Alternately, they are specifically constructed to automatically release the clutch at either a predetermined low or predetermined high range of speed in order to protect the power train.

Summary and Objects of the Invention

Accordingly, it is an object of the present invention to provide a control system for a rotating clutch with a centrifugally responsive valve having increased sensitivity to a relatively low pressure within a clutch piston actuating chamber.

Another object of the present invention is to provide such an improved control system with a centrifugally operated valve which is better able to respond to a wider range of fluid control pressures and to a torus of fluid in a radially inwardly open clutch piston actuating chamber for more accurately controlling the biasing effect of the fluid torus on a clutch actuating piston.

Another object is to provide a centrifugally responsive valve and an associated rotating clutch control system having the aforementioned characteristics which is stable and predictable in its response, while also being relatively economical in construction.

Other objects and advantages of the present invention, such as eliminating flow forces through the centrifugally responsive valve, will become more readily apparent upon reference to the accompanying drawings and following description.

BRIEF DESCRIPTION OF THE DRAWINGS

FIG. 2 is an enlarged fragmentary longitudinal vertical section of the input portion of the transmission shown in FIG. 1 taken through the axis of rotation thereof, and showing a pair of juxtaposed forward and reverse rotating clutches and their associated centrifugal relief valves in accordance with the present invention.

FIG. 3 is a further enlarged, fragmentary section of the centrifugal relief valve shown in the lower half of FIG. 2 with the valve disposed in a meteringly relieving mode of operation with respect to the fluid in the forward clutch actuating chamber.

FIG. 4 is a sectional view similar to FIG. 3 only with the centrifugal relief valve shown in a fully exhausting mode of operation.

FIG. 7 is a fragmentary longitudinal vertical section of a second embodiment centrifugal relief valve in a meteringly relieving mode of operation in a manner generally corresponding to FIG. 3.

DESCRIPTION OF FIRST EMBODIMENT

Figure 1:
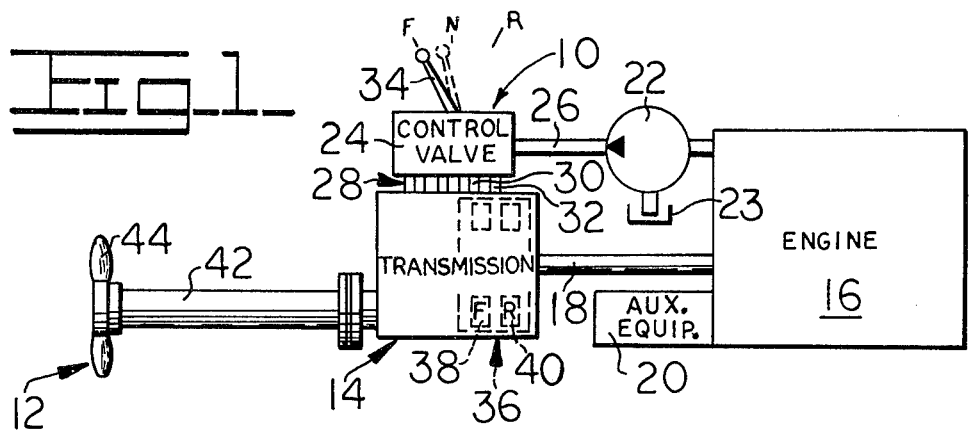
FIG. 1 is a schematic elevational side view of a marine propulsion system and transmission enbodying the rotating clutch control system of the present invention.

Referring to the drawings, a rotating clutch control system identified generally by the reference numeral 10 and embodying the principles of the present invention, is shown in FIG. 1 in the environment of a marine propulsion system power train 12 including a marine transmission 14. A power plant or engine 16 delivers torque to the marine transmission through a driving member 18, and also drives auxiliary equipment 20 such as fish-net-handling winches or the like, as well as a hydraulic pump 22.

A clutch control valve or transmission control 24 receives pressurized fluid from the pump 22 and suitable reservoir 23 through an inlet conduit 26 and supplies it under controlled conditions to the marine transmission 14 through a plurality of passages identified generally by the reference numeral 28. These passages more specifically include a forward clutch supply passage 30 and a reverse clutch supply passage 32. A manually operated speed and directional control lever 34 associated with the control valve has a centrally disposed neutral position N, and forward and reverse positions F and R disposed on either side thereof for communicating fluid from the inlet conduit 26 to the forward and reverse clutch supply conduits 30 and 32, respectively, as will hereinafter be described.

A dual rotating clutch assembly 36, including a forward rotating clutch 38 and a reverse rotating clutch 40, is disposed at the input end of the marine transmission 14 for selectively directing power to a propeller output shaft 42 and a propeller 44. As may be best visualized with reference to FIG. 2, the dual rotating clutch assembly is driven by the engine 16 and the driving member 18 at an input gear member 46 as schematically indicated by the arrow identified by the letter A. In this way the clutch assembly is peripherally rotated about a longitudinal axis identified by the letter S and power is subsequently delivered to either a forward output shaft 48 or a reverse output shaft 50 concentrically supported within it in accordance with engagement of either the forward or reverse rotating clutches, respectively. These output shafts are coupled to the output shaft 42 of the power train 12 shown in FIG. 1 through gearing of the type shown in U.S. Pat. No. 3,566,707 issued Mar. 2, 1971 to G. W. Schulz, and assigned to the assignee of the present invention.

More specifically, the rotating clutch assembly 36 of the present invention has a rotating housing 51 including in substantially series-related order the input gear member 46, a reverse clutch drive ring 52, a clutch piston retaining cylinder 54, a forward clutch drive ring 56 and an end plate 58 which are axially held together by a plurality of peripherally arranged, longitudinally oriented fasteners or bolts 60. Internally associated therewith is the reverse rotating clutch assembly 40 which includes a plurality of externally toothed clutch plates 64 which are axially slidable on a corresponding plurality of driving splines 66 formed on the inner periphery of the reverse clutch drive ring 52, and a plurality of internally toothed clutch discs 68 which are axially slidable on a like number of driven splines 70 formed on the forward radial periphery of the reverse output shaft 50. Similarly, the forward rotating clutch assembly 38 includes a plurality of externally toothed clutch plates 72 which are axially slidable on a plurality of driving splines 74 formed on the inner periphery of the forward clutch drive ring 56, and a plurality of internally toothed clutch discs 76 axially slidable on a like number of driven splines 78 formed on the forward radial periphery of the forward output shaft 48. A plurality of schematically illustrated antifriction bearings 80, 82 and 84 are disposed between the rotating clutch assembly 36 and the output shafts 48 and 50 in the usual manner to allow relative rotation therebetween. Also, another similar bearing 86 is disposed between the forward output shaft 48 and a stationary housing portion 88 to give additional support to the rotating clutch assembly.

Reference is now made to the construction of the centrally disposed clutch piston retaining cylinder 54 shown in FIG. 2, which has a pair of symmetrically opposite, axially outwardly facing, piston-receiving, bores or annular cavities 90 and 92 serving to form therebetween a radially inwardly extending central wall 94. It also includes a substantially radially extending centrifugal relief valve bore 96 which opens partially radially inwardly on the cavity 90 of the forward rotating clutch 38 as shown at the lower portion of FIG. 2, and a similar valve bore 98 which opens partially radially inwardly on the cavity 92 of the reverse rotating clutch 40 as shown at the upper portion thereof. As illustrated in the lower portion, the valve bore 96 is in axially open communication with a fluid exhaust passage 100 and a forward clutch control passage 102, while the other valve bore 98 is similarly in communication with a fluid exhaust passage 104 and a reverse clutch control passage 106. A forward clutch fluid supply path 108 in the rotating housing 51 opens axially rearwardly of the central wall 94 and is in communication with the control passage 102 so that, in general, fluid may be selectively delivered thereto through intermediate circuitous passages of the usual type as shown by the forward clutch actuating flow arrows B from the forward clutch supply passage 30 and the control valve 24 of FIG. 1. In a like manner a reverse clutch fluid supply path 110 opens axially forwardly of the central wall and is in open communication with the reverse control passage 106 as shown in the upper part of FIG. 2.

A forward clutch actuating piston 112 and a reverse clutch actuating piston 114 are respectively received within the oppositely facing annular cavities 90 and 92 of the piston retainer to define with the central wall 94 a radially inwardly open forward clutch piston actuating chamber 116 and a similar reverse clutch piston actuating chamber 118. As representatively shown in the upper left portion of FIG. 2, each of the actuating pistons includes a plurality of axially outwardly facing, cylindrical pockets 120 adapted to receive a corresponding plurality of relatively light-force-exerting piston retraction springs 122. These springs are also received in corresponding axially opposite pockets in the drive rings 52 and 56 to insure positive disengagement of the clutches in the absence of sufficient counteracting fluid pressure in the actuating chambers to bias the actuating pistons. An annular seal ring 124 is disposed about the outer periphery of each of the axially slidable pistons to provide a substantially fluid-tight relationship between the pistons and the cavities. Also, as representatively shown in the lower right portion of FIG. 2, each of the actuating pistons includes a plurality of axially outwardly facing blind bores 126 adapted to slidably receive a corresponding number of axially positioned dowels 128 which are fixedly associated with the drive rings 52 and 56 in such a manner that axial sliding movement of the pistons is permitted while any rotation therebetween is prevented. Each of the actuating pistons further has a plurality of axial protrusions or embossments 130 facing inwardly toward the central wall 94 to provide a predetermined minimum axial distance between the piston and the wall. This assures that a sufficient minimum size of the fluid chambers 116 and 118 is available for positive and rapid engagement of the clutch assemblies 38 and 40.

In accordance with the present invention, a differentially sensitive centrifugal relief valve 132 is disposed within each of the valve bores 96 and 98 as representatively shown best in the enlargement of FIG. 3. These valves individually include a substantially cylindrical reaction slug 134 which is normally urged radially outwardly against a relief valve access plate 136 and a cylindrical cup-shaped relief piston 138 which is adapted for free radial sliding movement thereon. The relief piston has an annular groove 140 peripherally formed therein and a side passage 142 therethrough opens on the groove and also on an internal reaction chamber 144 defined between the relief piston and the reaction slug. The relief piston is shown in FIG. 3 in a meteringly relieving, radially intermediate position in its bore, and to achieve this mode of operation, fluid is supplied to the forward clutch supply path 108 and to the forward clutch piston actuating chamber 116 through a flow limiting orifice 146 defined in the path in the clutch piston retaining cylinder 54. At the same time, the pressure in the supply path is communicated to the reaction chamber 144 through the passages 102 and 142 to bias the relief piston radially inwardly in opposition to the pressure in the piston actuating chamber 116 and in opposition to the centrifugal force acting thereon.

Pursuant to the present invention the pressure in the piston actuating chamber 116 acts against the full cross sectional area of the relief piston 138, while the control pressure in the supply path 108 acts against only the cross sectional area of the reaction slug 134. At the same time the radially outward ends of the reaction slug and relief piston are depressurized due to their free communication with a drain passage 145 in the access plate 136. In this way, through the differential areas exposed to fluid pressure, the centrifugal relief valve 132 effectively amplifies the force of the frequently relatively low fluid pressure conditions in the piston actuating chamber to make it more sensitive thereto and easier to control.

While the forward clutch actuating piston 112 is urged leftwardly when viewing FIG. 2 by a torus of fluid in the actuating chamber 116 to cause at least partial engagement of the forward rotating clutch 38 in response to the aforementioned metering relief action by the centrifugal valve 132, it should be appreciated that the reverse clutch centrifugal relief valve shown in the upper portion of FIG. 2 is in a fully exhausting mode of operation. This is so because the reverse clutch centrifugal relief valve is not simultaneously exposed to any supply pressure in the reverse clutch fluid supply path 110, and it is biased outwardly by centrifugal force and any fluid in the actuating chamber 118 to a position where it abuts the access plate 136. In such position the exhaust passage 104 is in open communication with the reverse clutch piston actuating chamber so that any fluid therein is allowed to rapidly be exhausted radially outwardly through the bore 98 and axially rearwardly via the exhaust passage.

Pursuant to the present invention, the pressure in the forward or reverse clutch fluid supply paths 108 and 110 may be controlled to such a degree that one of the centrifugal relief valves 132 will precisely limit the radial fluid torus depth to substantially any intermediate level radially inwardly from the diameter of either of the annular cavities 90 or 92. Thus, the effective inner radius of the fluid torus may be varied to achieve either complete or continuous partial engagement of the forward rotating clutch 38 or the reverse rotating clutch 40 through a range corresponding to the arcuately swung disposition or setting of the control lever 34, and by the action of the torus on the clutch actuating pistons 112 or 114.

It is to be noted that the bearings 80, 82, 84 and 86 of the dual rotating clutch assembly 36, as well as the clutch plates 64 and 72 and the clutch discs 68 and 76 thereof, are continually lubricated to extend their service life. This is achieved by directing lubricating fluid through a portion of the control valve 24 and the passages 28 through two paths internally of the output shafts 48 and 50 as shown by the flow arrows indicated by the reference letters C and D in FIG. 2. Thereafter, the lubricating fluid is directed radially outwardly through the interleaved plates and discs to continually cool them, and subsequently is communicated to exhaust through a plurality of other fluid relief passages 147 to be substantially directed axially away from the piston actuating chambers 116 and 118 where the fluid could otherwise detrimentally influence operation of the clutches. For this same reason an oil shield 148 is secured to the reverse output shaft 50 in substantially axially aligned relation to the central wall 94 and in outwardly extending relation therefrom to overlap the piston actuating chambers.

Operation

While the construction and operation of the present invention is believed clearly apparent from the foregoing description, further amplification will subsequently be made in the following brief summary of the operation thereof. When the transmission control lever 34 shown in FIG. 1 is disposed in its forward F position, the control valve 24 delivers fluid at a predetermined and relatively high pressure of, for example, 150 psi, through the supply passage 30. As best shown in FIGS. 2 and 3, the fluid is thereafter communicated to the supply path 108 and to the general area of the centrifugal relief valve 132. It is to be noted that such control fluid is then delivered directly to the clutch piston actuating chamber 116 through the flow limiting orifice 146 without passing through the centrifugal relief valve in order to minimize flow forces thereon which could deleteriously affect it. Simultaneously therewith, the fluid in the supply passage is directed through the passages 102 and 142 to pressurize the reaction chamber 144 intermediate the relief piston 138 and reaction slug 134. Thus, the fluid pressure in the reaction chamber acting on the relatively smaller area of the reaction slug serves to bias the relief piston radially inwardly against centrifugal force acting on it and also in opposition to the pressure in the piston actuating chamber which reacts against the full cross-sectional area of the relief piston. It should be appreciated that prior to gradually radially inwardly building up a torus of fluid in the piston actuating chamber, that the direct access of the control pressure to the reaction chamber causes the relief piston to be disposed fully radially inwardly in blocking relation with respect to the exhaust passage 100. As a result, fluid continues to increase in depth radially inwardly from the annular cavity 90 until the relief piston is biased radially outwardly by the fluid torus to meteringly relieve fluid to the exhaust passage as shown in FIG. 3. In this way the centrifugal relief valve, continually relievably meters fluid to the exhaust passage 100 in a differential area ratio responsive manner.

The size or cross sectional area of the flow limiting passage 146 limits the maximum rate of fluid flow to the piston actuating chamber 116 and, hence, the maximum rate of engagement of the clutch actuating piston 112 to promote gradual engagement thereof. Further, the fluid excess which is normally meteringly exhausted across the centrifugal relief valve is also limited. This decreases the amount of circulating fluid during steady state performance, enhances system reliability, and saves energy. When the control lever 34 is selectively manipulated to neutral or reverse away from the aforementioned forward clutch position, the control valve 24 immediately depressurizes the forward clutch supply passage 30 and reduces pressure in the fluid supply path 108 leading to the centrifugal valve 132. This results in a corresponding immediate pressure drop in the reaction chamber 144 intermediate the reaction slug 134 and relief piston 138 which is sufficient to cause the immediate radial outward movement of the relief piston to the position shown in FIG. 4 because of the pressure of the fluid torus. Thus, substantially immediate and complete dumping of the fluid in the piston actuating chamber 116 is achieved through the relief valve bore 96 and the exhaust passage 100 to allow rapid disengagement of the forward clutch actuating piston 112.

Figure 5:
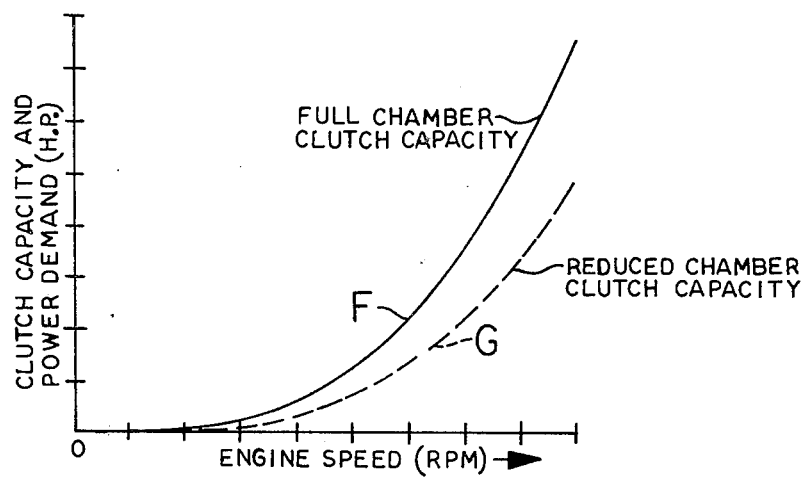
FIG. 5 is a graph showing the relationship of the capacity of a rotating clutch utilizing the features of the present invention in horsepower to the engine input speed in revolutions per minute for both a fully engaged and a partially engaged state.

It should be appreciated that when a maximum amount of fluid exists in either of the piston actuating chambers 116 or 118, the total force acting on their corresponding clutch actuating pistons 112 and 114 is proportional to the square of the speed of rotation of the rotating housing 51 or is therefore responsive to engine speed. Such relationship is generally represented by the graph of FIG. 5 wherein the solid line curve identified by the letter F represents a maximum clutch capacity in horsepower with respect to increasing engine speed in rpm. Curve F takes into account the fact that the actuating pistons are biased toward disengagement by their respective retraction springs 122, so that a relatively low spring force must be subtracted from the force of the rotating fluid torus to arrive at the resultant capacity curve. It is further apparent that with a lesser amount of fluid in the clutch piston actuating chamber, or with a smaller fluid torus size for a given rpm corresponding to a lower control pressure, the total force acting on the clutch actuating piston is reduced as representatively shown by the phantom line curve identified by the letter G.

Figure 6:
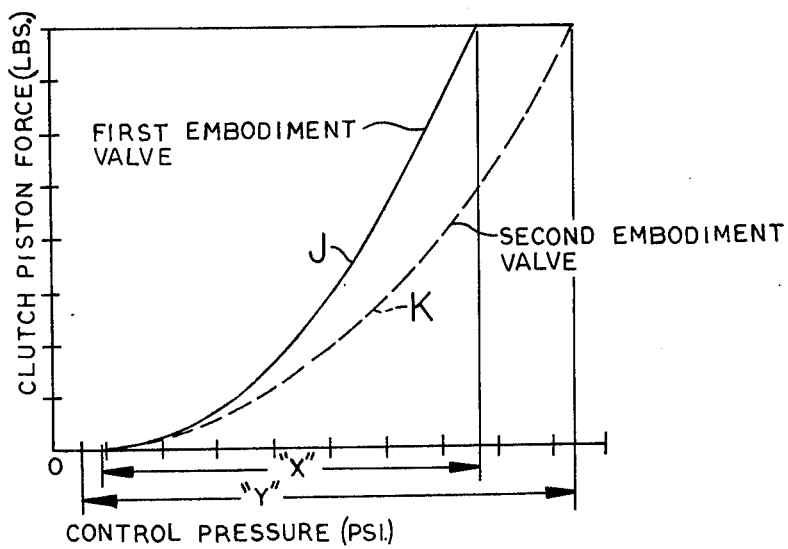
FIG. 6 is a graph showing the relationship of clutch piston force in pounds versus control pressure in pounds per square inch at the first embodiment centrifugal relief valve of FIGS. 2, 3 and 4, and also at the second embodiment centrifugal relief valve of FIG. 7.

It has been found that with the first embodiment centrifugal relief valve 132, the control pressure in the supply path 108 or 110 permits establishment of a clutch piston force as shown by the solid line curve identified with the letter J, in the graph of FIG. 6. In this illustrated example, clutch piston engagement is initiated at a pressure corresponding to approximately 20 psi, and full engagement at a control pressure of approximately 150 psi. In accordance with one of the features of the present invention, this provides a relatively wide, overall pressure range as identified by the letter X which is approximately 130 psi. This relatively wide range is made possible by the pressure amplifying characteristic of the centrifugal relief valve 132 due to its differential pressure area construction. Because of this characteristic the clutch control valve 24 may be of less sensitive and more economical construction.

Thus, the illustrated clutch control system 10 of the present invention allows even relatively low pressure control of the radially inwardly open fluid torus in the clutch piston actuating chambers 116 and 118. As a consequence these pressures may selectively be accurately modulated to achieve a reduced clutch capacity, permitting controlled slip of the clutch and less power to the propeller 44 while maintaining the speed of the engine 16. As shown in FIG. 1, the control lever 34 may be moved to a position intermediate the maximum flow rate forward and reverse positions identified by the letters F and R, respectively, and partially toward the centrally disposed neutral position N as shown by the broken lines. With this intermediate positioning of the control lever, the pressure of fluid delivered to the centrifugal relief valve 132 and forward clutch actuating chamber 116 via the path 108 may be reduced to decrease the clutch capacity substantially as shown by the phantom curve identified by the letter G and mentioned above with respect to FIG. 5. A still further clockwise movement of the control lever from the phantom line position shown in FIG. 1 causes the control valve 24 to deliver even less control pressure, thereby decreasing the size of the fluid torus by the new condition imposed on the centrifugal relief valve. This results in a further decrease in clutch capacity and, in effect provides a greater priority to the horsepower demands of the auxiliary equipment 20 and the pump 22 and less priority to the propeller 44.

In accordance with another aspect of the present invention, a rapid directional shift of the control lever 34 from, for example, a forward to a reverse position, will immediately disconnect the forward rotating clutch assembly 38. This will be followed by a desirably smooth and modulated rate of engagement of the reverse rotating clutch assembly 40. This is related to the rate of growth of the fluid torus in the reverse clutch piston actuating chamber 118, which is in part dependent on the sizing of the flow limiting orifice 146 and the speed of rotation of the rotating housing 51. In this manner the rotating clutch control system 10 is tailored to cushion or otherwise absorb the shocks associated with such directional shifts. For an additional understanding of the advantages of clutch engagement solely through the action of a rotating fluid torus upon an actuating piston, reference is made to U.S. Pat. No. 3,872,956 mentioned above.

DESCRIPTION OF SECOND EMBODIMENT

As shown in FIG. 7, a more complex second embodiment differentially sensitive centrifugal relief valve 150 includes a smaller diameter and longer reaction slug 152 disposed within a somewhat thicker walled relief piston 154 so the reaction slug has less tendency to become radially misaligned. While otherwise being substantially identical to the first embodiment centrifugal relief valve 132, as indicated by use of the same reference characters on similar parts, the central wall 94 is provided with a radially inwardly opening compensating passage 156 that extends radially outwardly to a modified valve access plate 158. Lubricating fluid within the rotating housing 51 is limitedly directed radially outwardly to the compensating passage to permit the pressure of a rotating column of fluid formed therein to be directly communicated with the radially outer end of the reaction slug and the radially outer peripheral end of the relief piston. This provides an additional speed sensitive force thereon tending to bias them radially inwardly, and allows the centrifugal relief valve to be less sensitive to speed.

As shown by the phantom line curve identified by the letter K in FIG. 6, the second embodiment centrifugal relief valve 150 also has a relatively wider control pressure range than the first embodiment indicated by the letter J. Further, because of the flatter slope of the phantom line curve in the region of low clutch piston force, extremely small degrees of change in the size of the fluid torus are possible. This increased sensitivity is advantageous for close maneuvering of the vessel, for example.

Thus, it is apparent that the rotating clutch control system 10 of the present invention includes a differentially sensitive centrifugal relief valve 132 disposed on the input side of a rotating clutch which has increased ability to meteringly relieve even a relatively low pressure fluid torus in the actuating chamber. Because of its differential area ratio the centrifugal relief valve is better able to respond to relatively higher pressures from the control valve and through a broader range of pressures. Since flow of fluid does not go through the centrifugal relief valve to the clutch piston actuating chamber, it is not subject to these variable flow forces and is relatively stable and predictable in response.

While the present invention has been described and shown with reference to a marine propulsion system, it will be apparent that it can be utilized elsewhere and that variations might be possible that would fall within the scope of the present invention, which is not intended to be limited except as defined in the following claims.

What is claimed is:

1. A control system, for a rotating clutch having a rotating housing with a cavity adapted to axially slidably receive a clutch actuating piston therein and defining a clutch actuating chamber therebetween, comprising;
    a source of fluid;
    a control valve for infinitely variably supplying said fluid through a path in the rotating housing to such clutch actuating chamber so that the clutch actuating piston is biased in a direction to engage the clutch;
    passage means in said rotating housing including a radially disposed bore of a predetermined cross sectioned area disposed in fluid communication with said clutch actuating chamber and said path, and including a fluid exhaust passage connecting therewith; and
    differentially sensitive centrifugal valve means including a relief piston slidably mounted in said bore and biased radially outwardly by centrifugal force and by the fluid pressure in said clutch actuating chamber acting on said cross sectional area for relieving fluid from said clutch actuating chamber to said exhaust passage, and including a reaction slug disposed within said relief piston and providing an effective cross sectional area less than said predetermined area in communication with fluid pressure in said path which biases said piston radially inwardly.

2. The control system of claim 1 wherein said passage means includes a control passage intermediate said bore and said path and said relief piston is cup-shaped and has a side passage therethrough in open communication with said control passage, and said reaction slug and said relief piston define an enclosed reaction chamber which eliminates fluid flow forces to said clutch actuating chamber across said centrifugal valve means.

3. A control system, for a rotating clutch having a rotating housing with a cavity adapted to axially slidably receive a clutch actuating piston therein and defining a radially inwardly open clutch actuating chamber therebetween, comprising;
    a source of fluid;
    a control valve for infinitely variably supplying said fluid through a path in the rotating housing to such clutch actuating chamber so that the clutch actuating piston is biased in a direction to engage the clutch solely through centrifugal force acting on a torus of fluid in said chamber;
    a valve bore in said housing opening on said chamber;
    a fluid exhaust passage in said housing opening on said valve bore;
    a control passage in said housing communicating said path with said valve bore; and
    centrifugal relief valve means including a relief piston slidably mounted in said bore and radially outwardly biased by the pressure of said torus of fluid in said chamber acting thereon over the cross sectional area of said bore, and including a reaction slug slidably disposed within said relief piston, said relief piston radially inwardly biased by the pressure in said control passage acting on the area of said slug for meteringly relieving fluid from said clutch actuating chamber to said exhaust passage in a differential area ratio responsive manner.

4. The control system of claim 3 wherein said relief piston is generally cup-shaped and has a side passage therethrough, and defines with said reaction slug a reaction chamber which is in open communication with said control passage through said side passage so that fluid flow forces to said clutch actuating chamber across said centrifugal relief valve means are eliminated.

5. The control system of claim 4 including a flow limiting orifice in said path to said clutch piston actuating chamber to decrease the rate of circulating fluid therethrough during steady state performance.

6. A control system, for a rotating clutch having a rotating housing with a cavity adapted to axially slidably receive a clutch actuating piston therein and defining a radially inwardly open clutch actuating chamber therebetween, comprising;
    a source of fluid;
    a control valve of infinitely variably supplying said fluid through a path in the rotating housing to such clutch actuating chamber so that the clutch actuating piston is biased in a direction to engage the clutch solely through centrifugal force acting on a torus of fluid in said chamber;
    a valve bore in said housing opening on said chamber;
    a fluid exhaust passage in said housing opening on said valve bore;
    a control passage in said housing communicating said path with said valve bore;
    a substantially cylindrical reaction slug; and a cup-shaped centrifugal relief piston having a side passage therethrough slidably mounted within said bore and upon said reaction slug to define a reaction chamber therebetween for meteringly relieving fluid from said clutch actuating chamber to said exhaust passage in response to radially outward biasing thereof through said torus of fluid and in opposition to pressure in said path which is communicated to said reaction chamber by said control passage and said side passage.

7. The control system of claim 6 wherein said relief piston and said reaction slug are depressurized at the radially outer ends thereof through a drain passage in said rotating housing.

8. The control system of claim 6 including a compensating passage in said rotating housing which is radially inwardly open to fluid in said rotating clutch to provide a column of fluid which is communicated with the radially outer ends of said relief piston and said reaction slug in order to provide an additional speed sensitive force thereon.

* * * * *